March 16, 1937.  R. E. UPHOFF  2,074,195
PRESSURE RELIEF VALVE
Filed March 30, 1935
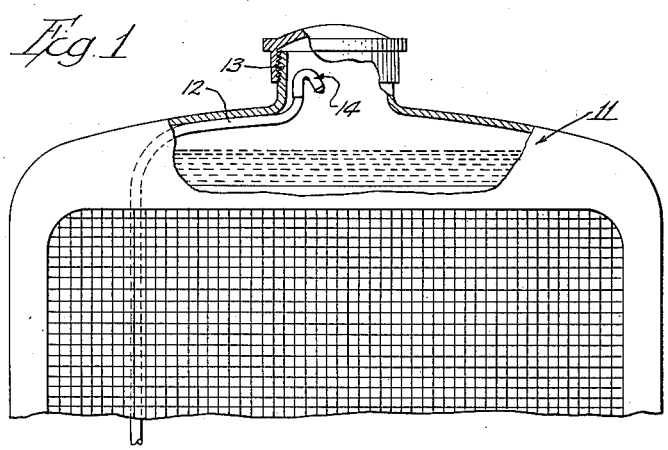
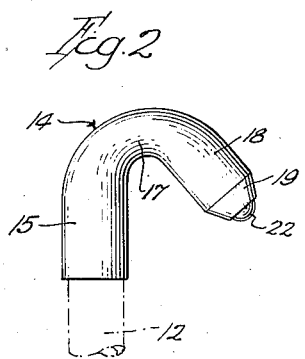
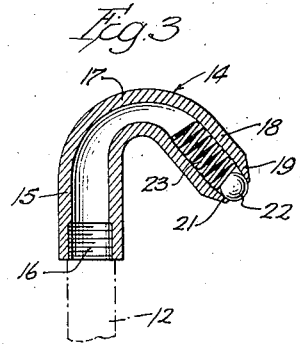
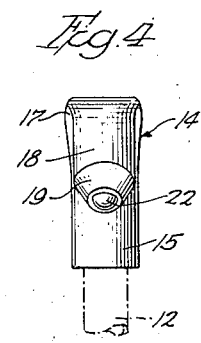
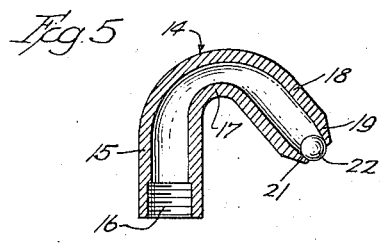
Inventor
Ralph E. Uphoff
Charles B. Rasmussen
Atty.

Patented Mar. 16, 1937

2,074,195

UNITED STATES PATENT OFFICE 2,074,195

PRESSURE RELIEF VALVE

Ralph E. Uphoff, Madison, Wis.

Application March 30, 1935, Serial No. 13,867

2 Claims. (Cl. 137—53)

This invention relates in general to pressure relief valves, and has more particular reference to a valve for closing an automobile radiator overflow pipe at all times except when a predetermined pressure is created inside of the radiator.

A principal object of the invention is the provision of a valve which will seal the overflow pipe from an automobile radiator under all normal conditions to prevent the escape of water, non-freezing compounds, or other liquids or vapors, but which will automatically vent the radiator whenever a dangerous pressure is created therein, such as overheating and expansion of the liquids.

Another important object of the invention is the provision of such a device which, under normal conditions, will prevent objectionable odors, such as fumes from a non-freezing compound, steam and the like, from escaping and entering the automobile.

Numerous other objects and advantages of the invention will be apparent as it is better understood from the following description, which, taken in connection with the accompanying drawing, discloses a preferred embodiment thereof.

In the drawing,

Figure 1 is a front elevational view of the upper portion of an automobile radiator, with parts broken away and in section, showing the application of a device embodying the features of my invention;

Fig. 2 is an enlarged front elevation of the pressure relief valve;

Fig. 3 is a vertical sectional view;

Fig. 4 is an end view as seen from the right of Fig. 2; and

Fig. 5 is a sectional view, similar to Fig. 3, of a modified form of the invention.

Referring more particularly to the drawing, reference character 11 indicates an automobile radiator of any desired type, having the usual overflow pipe 12 located and secured therein in any suitable manner, with its upper end terminating or disposed in the filling neck 13 of the radiator.

The pressure relief valve is indicated generally at 14 and is adapted to be secured at its lower end to the upper end of the overflow pipe 12.

The valve member 14 is made from a relatively short piece of tubing, preferably tin, lead, or a tin and lead alloy, which will provide a rust proof structure. The lower end 15 of the tube may be provided with a threaded portion 16 in the bore thereof for attachment to the upper end of the overflow pipe 12, or the end 15 may be pressed onto the pipe 12 or slipped over the upper end thereof and crimped or otherwise secured in place.

The tube is bent at 17 intermediate its ends so that the upper end 18 is disposed at an acute angle to the lower end 15, and in such a manner that the bore is materially narrowed or decreased in size adjacent the bent or intermediate portion 17, for a purpose to be later described.

The terminal portion of the upper, angularly disposed end 18 is turned down or beveled, as at 19, and pressed inwardly a small amount so as to decrease the size of the bore of the tube at the end thereof to provide a valve seat 21.

Positioned within the bore of the upper or angularly disposed portion 18 of the tube is a spherical or ball valve member 22 of such size as to properly seat against the valve seat 21 while providing sufficient clearance when forced upwards into the bore to permit of the escape of fluids into the overflow pipe 12.

In the form shown in Fig. 3, a coil spring 23 is disposed in the bore of the upper or angularly disposed portion 18 of the tube. The spring is of substantially the same diameter as that portion of the bore within which it is housed and is restrained against movement at its upper end by the decreased size of the bore in the intermediate portion 17 of the tube. The lower end of the spring 23 bears against the ball 22 to maintain it seated firmly against the seat portion 21 until sufficient pressure is built up in the radiator 11 to force the ball upwards into the bore against the pressure of the spring.

In the embodiment shown in Fig. 5, the coil spring 23 is not used, but the device is otherwise identical to that of Fig. 3. This form is adapted to be used where a lower relief pressure is desired, since the weight of the ball 22 is all that keeps the valve closed. Such an arrangement is extremely satisfactory, however, up to such pressure as determined by the weight and exposed area of the ball 22. In this modified form, the decreased size of the bore in the bent or intermediate portion 17 prevents the ball 22, traveling therepast, from being lost in the overflow pipe 12. Since a slight widening of the intermediate portion 17 of the tube is effected in the bending thereof, as is shown in Fig. 4, liquid or vapor under pressure may still escape past the ball 22 even though it be forced to its upper limit of travel.

In the embodiment of Fig. 3, the radiator may be vented at any desired pressure without changing the size of the ball or tube or weight of the ball, as in that of Fig. 5, by using a stronger or weaker spring 23.

The threaded portion 16, if such be used, is preferably tapped before the tube is bent. In the modification of Fig. 5, the beveled portion 19 and valve seat 21 may also be formed before the tube is bent, the ball 22 being inserted from the lower end 15 before such final operation of bending. But in the modification of Fig. 3, the bending operation is preferably performed before the forming of beveled portion 19 and valve seat 21, the latter being done after the spring 23 and ball 22 have been inserted into the angularly disposed portion 19.

From the above description it will be apparent that under normal operating conditions the escape of water, non-freezing compounds, or other liquids or vapors will be prevented, but that the radiator will be automatically vented when a predetermined pressure is created therein. The vapors thus retained during normal operation will condense and return to their original form, thus further eliminating waste and disagreeable odors.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A pressure relief valve, comprising an integral tubular member having a main lower end portion adapted to be connected to the upper end of an overflow tube of a radiator, an intermediate bent portion, and an upper end portion angularly disposed relative to said lower end portion, a valve seat formed at the lower end of said angularly disposed upper end portion, and a ball valve member movable in the bore of said angularly disposed upper end portion and adapted to co-operate with said valve seat, the bore of said intermediate bent portion being decreased in size in one direction by the bending thereof to prevent said ball being forced therethrough.

2. A pressure relief valve adapted to be connected to the upper end of an overflow tube of a radiator, comprising an integral tubular member having a main lower end portion, an intermediate bent portion, and an upper end portion angularly disposed relative to said main lower end portion, a valve seat formed at the lower end of said angularly disposed upper end portion, a ball valve member movable in the bore of said angularly disposed upper end portion and adapted to co-operate with said valve seat, and a spring disposed within the bore of said angularly disposed upper end portion to yieldably maintain said ball valve member against said valve seat, the bore of said intermediate bent portion being decreased in size in one direction by the bending thereof to maintain said spring in said angularly disposed upper end portion.

RALPH E. UPHOFF.